W. CHURCHILL AND E. PASCUCCI.
LENS.
APPLICATION FILED FEB. 15, 1916.
1,307,579.
Patented June 24, 1919.
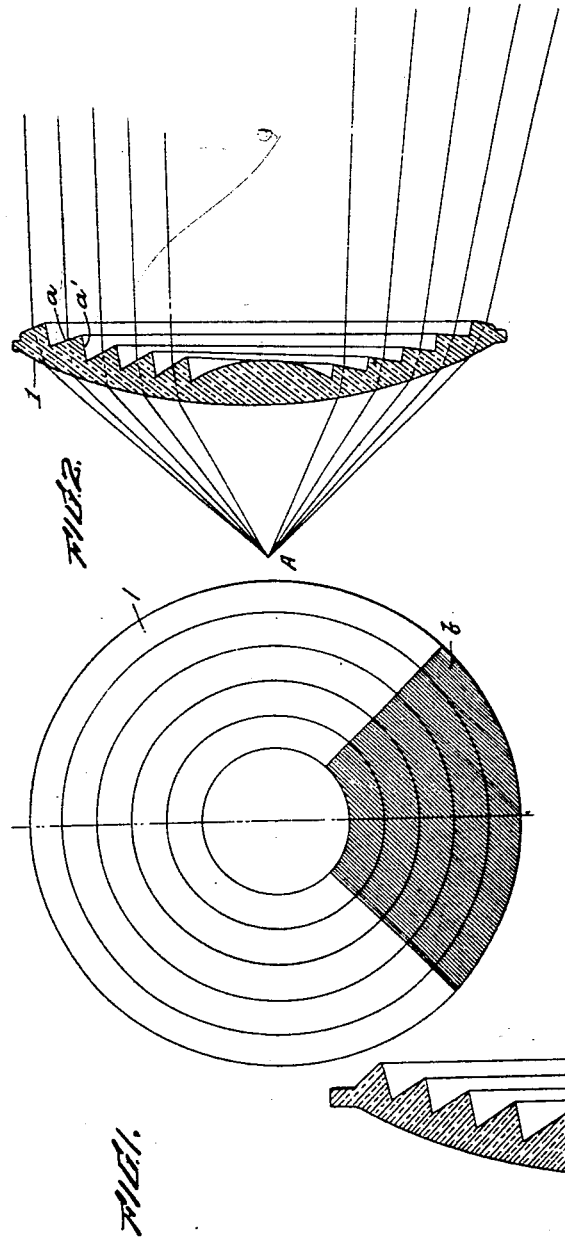
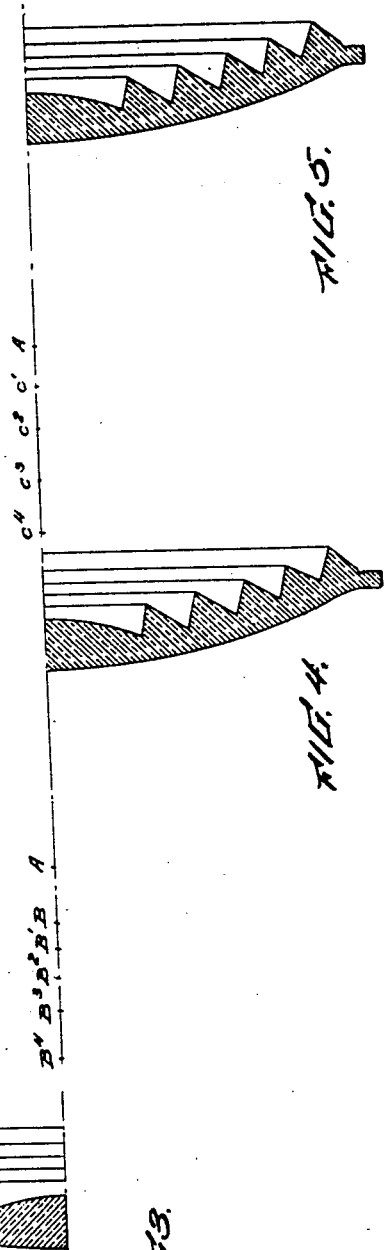
Inventors
William Churchill and
Emilio Pascucci.

UNITED STATES PATENT OFFICE.

WILLIAM CHURCHILL AND EMILIO PASCUCCI, OF CORNING, NEW YORK, ASSIGNORS TO CORNING GLASS WORKS, OF CORNING, NEW YORK, A CORPORATION OF NEW YORK.

LENS.

1,307,579.      Specification of Letters Patent.      Patented June 24, 1919.

Application filed February 15, 1916. Serial No. 78,498.

*To all whom it may concern:*

Be it known that we, WILLIAM CHURCHILL and EMILIO PASCUCCI, citizens of the United States of America, and residents of Corning, New York, have invented certain new and useful Improvements in Lenses, of which the following is a specification.

This invention has for its object to provide a construction in lenses which, while specially intended for railroad signaling, are applicable to other purposes to which the characteristics resulting from such construction, may render them of value. Briefly stated, the object had in view is the production of a lens as an integral structure adapted to project, when combined with a proper single light source, two or more beams of light, one being a beam of rays substantially parallel to the main axis of the lens, and the other being a beam of rays divergent in respect to each other and to the main axis. Lenses of this character are especially applicable to railway signals to be seen from successive points along a curved track. The field of observation here needed is an elongated area whose upper limit should not at any point be many feet above the track and whose width may be many yards. Light projected above the necessary height from the track is wasted and reduces by the same amount the efficiency of the light actually used in signaling. Again railway signals are commonly located at some distance above the tracks, and as they must be readable for a considerable distance in advance thereof when on tangents, a concentrated beam substantially parallel or slightly convergent to the track is demanded to produce the long range indication. The signal produced by such a beam is not, however, observable on more closely approaching the signal, as at such time the eye of the engineer is below the path of the concentrated long range beam. The diverging beam produced by the lens forming the subject matter of this invention may be so directed in relation to the concentrated beam that it is visible inside of the point at which the latter beam becomes inefficient.

With the above stated object in view, the invention comprises an integral Fresnel lens, formed by a series of zones, which zones have at one or more portions their curvature modified to project therefrom a beam divergent from the beam formed by the main portion of the lens, such modification of the curvature of the zones being localized at such portion or portions, whereby the character of the beam projected by the lens as a whole is not modified, except in so far as the same may follow from the removal of a part of the lens as a projecting means for such beam and the use of such portion as a projecting means for the divergent beam. Inasmuch as the divergent beam is generally used for close indication, it is desirable that the rays forming such beam be more divergent than the long range beams.

Referring to the accompanying drawings, in which corresponding parts are designated by corresponding marks of reference:—

Figure 1 is a front view of a lens constructed in accordance with our invention.

Fig. 2 is a vertical section thereof.

Fig. 3 is a half section through the lens of Fig. 1, as the same would appear when the line of section is vertical through the upper half of such lens or if inclined at angles of 135, 90 and 45 degrees from the vertical, showing the location of the principal focal point of such portions of the lens.

Fig. 4 is a corresponding section taken through the lower half of the lens.

Fig. 5 is a similar section, but showing a modified curvature which may be given to the side sectors of the lens.

The lens 1 is shown as having a curved rear face and a stepped front formed by zones $a$, united by miters $a'$. In the construction shown in Figs. 1 to 4, each zone has its front face at the lower quadrant thereof as at $b$ struck with a curve of greater radius than is the face of such zone at other points, as is particularly illustrated by comparison of Figs. 3 and 4, the latter representing the curvature of the zones at the bottom of the lens and the former the curvature of the zones at the upper part of the lens and at other points than in such lower quadrant. In other words, the curvature of each zone is uniform except in a selected sector thereof, in which a decreased curvature is localized. In this specification those parts of the lens on which are refracting faces of uniform curvature will be called the main portion of the lens, while the part of the lens in which the decreased curvature is localized will be called the toric portion of the lens. By placing a light source at the principal focal point A of the main part of the lens, such parts of the lens will project an approximately parallel beam, such as is useful for long distance indication, this beam being of high intensity, due to the parallel character of the rays forming it, and due to the fact that it is projected by a greater portion of the lens face. Such light source will, however, be forward of the principal focal points of the several zones of the toric portion of the lens, which will have their principal focal point B, $B^1$, $B^2$, etc., in the rear of the light source. Due to this location of the light source in front of the principal focal point of the toric portion of the lens, rays falling from such light source on the lens and passing therethrough will be projected, not as a parallel beam, but as a beam composed of divergent rays. Moreover, the zones in the toric portion of the lens are so constructed that the rays projected by each one of them diverge from the rays projected by the others, the extreme divergence being that of the outer zone, and the minimum divergence being that of the inner zone. The successive angles of divergence are so calculated that from a selected minimum distance of observation, the field of each zone overlaps the field of the adjacent zones. In the described location of the toric portion, it will be seen that such divergent beams will be projected downwardly toward the track, and thus serve for the signal indication at points where the main beam is not visible.

While in the above we have discussed a single toric portion at the bottom of the lens, it is obvious that this toric portion may be disposed in another quadrant, or that a plurality of toric portions may be placed upon the lens to satisfy the conditions to be met.

Thus when a more horizontal divergence is desirable in the beam than is provided for by side quadrants constructed as described for the top quadrant, the refracting faces for light passing through the zones or some of the zones of such quadrants may be of decreased curvature in respect to the faces of the zones on the upper quadrant.

Thus as shown in Fig. 5, the inner zone may have its principal focus at the point A before described, while the other zones focus at $C^1$, $C^2$, $C^3$, thus causing rays projected by the last named zones to be increasingly divergent.

A lens of the character described herein sharply differentiates itself from structures in which the refracting faces have their curvature uniformly varied from point to point, in that in such structures each part of a zone, having a different refractive power, projects the beams issuing therethrough in a direction different from the adjacent parts of the zone. Thus, the beam produced by the last named type of zone, instead of being two definitely distinct beams, is a single beam, made up of rays, each of which proceeds in its own direction. Such a lens is not applicable to signaling work, in that it does not produce the high intensity beam demanded for long distance indication.

It is further obvious that while we have described out invention by the use of the terms top, bottom and side, and the divergence as downward or sidewise, such terms are merely used for convenience and that our invention embraces a lens having the characteristics claimed whatever be the position of the lens as a whole.

Having thus described our invention what we claim is:—

A signaling lens having a series of refracting zones, the principal focal points of said zones on one part of the lens being substantially the same for all the zones throughout such portion, and the principal focal points of said zones on a restricted sector of the lens being in the rear of the first named focal point and being different for the different zones in such sector.

In testimony whereof we have hereunto signed our names.

WILLIAM CHURCHILL.
EMILIO PASCUCCI.

Copies of this patent may be obtained for five cents each, by addressing the "Commissioner of Patents, Washington, D. C."